United States Patent
Sakamoto et al.

(10) Patent No.: US 9,822,510 B2
(45) Date of Patent: Nov. 21, 2017

(54) CONSTRUCTION MACHINE

(71) Applicant: Hitachi Construction Machinery Co., Ltd., Tokyo (JP)

(72) Inventors: Hiroshi Sakamoto, Tokyo (JP); Masatoshi Hoshino, Tsuchiura (JP); Shinji Ishihara, Tokyo (JP)

(73) Assignee: Hitachi Construction Machinery Co., Ltd., Tokyo (JP)

(*) Notice: Subject to any disclaimer, the term of this patent is extended or adjusted under 35 U.S.C. 154(b) by 0 days.

(21) Appl. No.: 14/762,959

(22) PCT Filed: Mar. 5, 2014

(86) PCT No.: PCT/JP2014/055624
§ 371 (c)(1),
(2) Date: Jul. 23, 2015

(87) PCT Pub. No.: WO2014/136834
PCT Pub. Date: Sep. 12, 2014

(65) Prior Publication Data
US 2015/0354171 A1 Dec. 10, 2015

(30) Foreign Application Priority Data

Mar. 6, 2013 (JP) ................................ 2013-044320

(51) Int. Cl.
*B60W 10/06* (2006.01)
*B60W 10/30* (2006.01)
(Continued)

(52) U.S. Cl.
CPC ........... *E02F 9/2075* (2013.01); *B60W 20/11* (2016.01); *B60W 20/13* (2016.01); *Y10S 903/903* (2013.01)

(58) Field of Classification Search
CPC .......... F02D 29/00; F02D 29/04; F02D 29/06; F02D 2700/07; E02F 9/20; E02F 9/2246
See application file for complete search history.

(56) References Cited

U.S. PATENT DOCUMENTS 5,274,557 A * 12/1993 Moriya ................. E02F 9/2296
37/348
6,094,617 A * 7/2000 Lapke ................. F02D 41/1497
123/350

(Continued)

FOREIGN PATENT DOCUMENTS

JP     09-322312 A    12/1997
JP     2007-262978 A    10/2007

(Continued)

OTHER PUBLICATIONS

JP2007262978 Machine translation retreived from https://worldwide.espacenet.com/.*

*Primary Examiner* — James A Shriver, II
*Assistant Examiner* — Vaughn Coolman
(74) *Attorney, Agent, or Firm* — Mattingly & Malur, PC

(57) ABSTRACT

To provide a construction machine that appropriately sets the magnitude of an engine output for each work mode. A construction machine according to the present invention includes: an engine (22); a generator-motor (23) configured to generate electric power by the engine; a hydraulic pump (41) configured to be driven by the engine and the generator-motor; a hydraulic actuator (32, 34, 36) that drives and operates a working device (30) with the power of the hydraulic pump; an electric storage device (24) for supplying electric power to drive the generator-motor and charging the electric power generated by the generator-motor; a work-mode selecting device (45, 46) that selects a work mode corresponding to operation of an operator; and an engine-output setting unit (403, 405, 407) that sets the (Continued)

magnitude of the output of the engine corresponding to the work mode selected by the work-mode selecting device.

4 Claims, 7 Drawing Sheets

(51) Int. Cl.
  *E02F 9/20* (2006.01)
  *B60W 20/13* (2016.01)
  *B60W 20/11* (2016.01)

(56) References Cited

U.S. PATENT DOCUMENTS

| | | | | |
|---|---|---|---|---|
| 6,772,060 B2 * | 8/2004 | McCauley | ............ | F02D 41/04 123/198 D |
| 6,920,387 B2 * | 7/2005 | Landes | ............ | F02D 41/083 123/339.19 |
| 7,373,239 B2 * | 5/2008 | Kamado | ............ | E02F 9/2246 701/103 |
| 7,454,282 B2 * | 11/2008 | Mizuguchi | ............ | F02D 29/02 477/97 |
| 7,664,586 B2 * | 2/2010 | Ozawa | ............ | E02F 9/2235 180/14.1 |
| 7,778,756 B2 * | 8/2010 | Hartwick | ............ | B62D 11/003 37/348 |
| 7,865,288 B2 * | 1/2011 | Fukushima | ............ | B60W 10/06 180/307 |
| 7,962,768 B2 * | 6/2011 | Grill | ............ | E02F 9/2235 701/50 |
| 7,979,183 B2 * | 7/2011 | Toda | ............ | E02F 9/2246 701/50 |
| 8,612,102 B2 * | 12/2013 | Ohhigashi | ............ | E02F 9/2075 414/687 |
| 9,026,317 B2 * | 5/2015 | Furukawa | ............ | B60R 16/02 701/50 |
| 9,121,159 B2 * | 9/2015 | Yamashita | ............ | F02D 41/029 |
| 9,267,455 B2 * | 2/2016 | Nakanishi | ............ | E02F 9/2066 |
| 9,340,953 B2 * | 5/2016 | Sakamoto | ............ | B60K 6/485 |
| 2009/0223214 A1 * | 9/2009 | Drake | ............ | B60K 6/12 60/327 |
| 2013/0057305 A1 * | 3/2013 | Jimbo | ............ | B60L 11/005 324/750.01 |
| 2013/0090835 A1 * | 4/2013 | Take | ............ | F02D 29/04 701/103 |
| 2013/0325293 A1 * | 12/2013 | Jacobson | ............ | E02F 9/2246 701/103 |
| 2015/0159347 A1 * | 6/2015 | Park | ............ | E02F 9/2246 701/50 |
| 2015/0204053 A1 * | 7/2015 | Imaizumi | ............ | F02D 29/04 701/50 |

FOREIGN PATENT DOCUMENTS

| | | |
|---|---|---|
| JP | 2010-216419 A | 9/2010 |
| JP | 2013-040487 A | 2/2013 |

* cited by examiner

FIG. 4
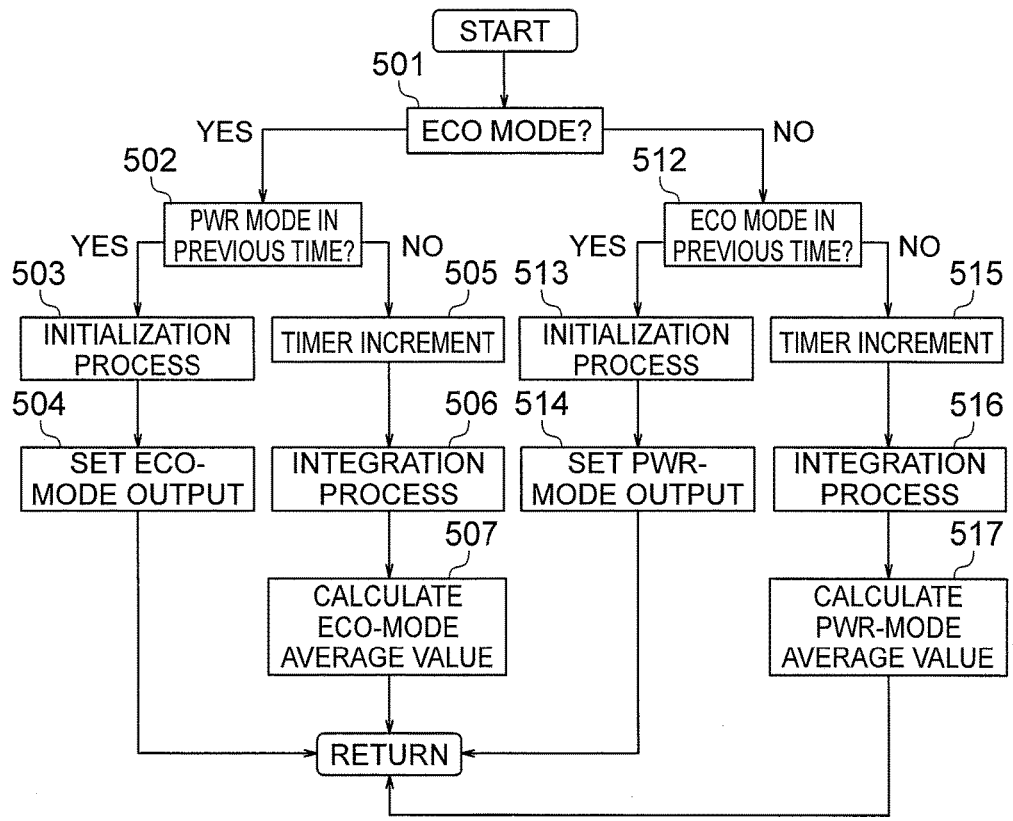
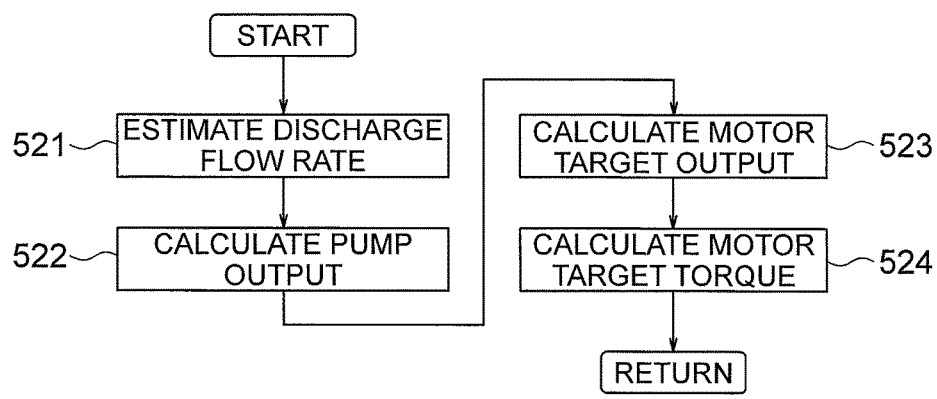

| MODE SW | EXCAVATION/ NON-EXCAVATION | OPERATION-MODE DETERMINATION | ENGINE OUTPUT REFERENCE VALUE |
|---|---|---|---|
| PWR | EXCAVATION | A | 100% |
| PWR | NON-EXCAVATION | B | 80% |
| ECO | EXCAVATION | C | 90% |
| ECO | NON-EXCAVATION | D | 70% |

(b)

| No. | PREVIOUS DETERMINATION | CONDITION | DETERMINATION FLAG |
|---|---|---|---|
| 1 | ON *NON-EXCAVATION | WHEN FOLLOWING CONDITIONS C1) TO C3) ARE ALL SATISFIED<br>C1) PUMP DISCHARGE PRESSURE ≧ PREDETERMINED VALUE<br>C2) ARM-CROWDING OPERATION AMOUNT ≧ PREDETERMINED VALUE<br>C3) WHEN ANY OF FOLLOWING CONDITIONS C3-1) AND C3-2) IS SATISFIED<br>　C3-1) BOOM-RAISING MANIPULATED VARIABLE ≧ PREDETERMINED VALUE<br>　C3-2) BUCKET-CROWDING MANIPULATED VARIABLE ≧ PREDETERMINED VALUE | OFF *EXCAVATION |
| 1 | ON *NON-EXCAVATION | OTHER THAN ABOVE | ON *NON-EXCAVATION |
| 2 | OFF *EXCAVATION | WHEN FOLLOWING CONDITIONS C1) AND C2) ARE ALL SATISFIED<br>C1) PUMP DISCHARGE PRESSURE ≧ PREDETERMINED VALUE<br>C2) ARM-CROWDING MANIPULATED VARIABLE ≧ PREDETERMINED VALUE | OFF *EXCAVATION |
| 2 | OFF *EXCAVATION | OTHER THAN ABOVE | ON *NON-EXCAVATION |

CONSTRUCTION MACHINE

TECHNICAL FIELD

The present invention relates to a construction machine such as a hydraulic excavator.

BACKGROUND ART

Conventionally, the mainstream construction machine such as a hydraulic excavator includes a hydraulic actuator that drives a hydraulic pump with an engine so as to drive and operate a working device using the power of this hydraulic pump. However, nowadays, for example, to improve the fuel efficiency of the engine, reduce the noise level, and reduce the exhaust gas amount, a hybrid-type construction machine is developed and put into practical use. The hybrid-type construction machine includes a generator-motor, which can generate electric power by the engine and is used for assisting the hydraulic pump, and an electric storage device (a capacitor, a battery), which supplies electric power to drive the generator-motor and charges the electric power generated by the generator-motor.

For example, Patent Literature 1 describes the following method in a hybrid work machine. The hybrid work machine includes: a hydraulic pump; an engine, which is coupled to allow transmission of power to the hydraulic pump; an electric motor, which is coupled to allow driving the hydraulic pump independently from the engine; and a battery. The method detects a variable corresponding to the output state of the hybrid work machine, calculates the average value of the variable during a predetermined time, which is set in advance, and sets the magnitude of the output of the engine corresponding to the calculated average value. This method controls the engine output corresponding to the parameter of the averaged output state of the hybrid work machine. This allows gradually changing the engine output so as to stabilize the operating state of the engine.

CITATION LIST

Patent Literature

Patent Literature 1: Japanese Unexamined Patent Application Publication No. 2007-262978

SUMMARY OF INVENTION

Technical Problem

Nowadays, in association with the global movement toward greening, there is an effort to reduce the fuel efficiency in progress also in the construction machine such as the hydraulic excavator. From this background, there is an increase in count of a construction machine that has a fuel-efficiency priority mode in addition to a conventional standard mode. This trend is particularly evident in the above-described hybrid-type construction machine.

As the mainstream method, an operator manually sets these modes (hereinafter referred to as work modes) using a switch or a touchscreen disposed within a cabin. Usually, in the case where a lightly-loaded work such as screeding is performed, the fuel-efficiency priority mode is selected, and otherwise the conventional standard mode is selected. Often, the fuel-efficiency priority mode is specified to place priority on the fuel efficiency and reduce the output (hereinafter referred to as a work output) of the hydraulic actuator to some extent, and the standard mode is specified to maximally utilize the work output.

In the hybrid work machine described in Patent Literature 1, the average value of the work output is calculated during the predetermined time, which is set in advance, so as to be reflected in the magnitude of the engine output. This is effective for the case where the work mode when the average value is calculated is identical to the work mode when the average value is reflected in the magnitude of the engine output. However, in the case where these work modes are different from each other, for example, in the case where the average value calculated in the fuel-efficiency priority mode is reflected in the magnitude of the engine output in the standard mode, excess or deficiency occurs between the work output and the engine output due to the difference of work. To compensate this excess or deficiency, the output of the electric motor increases. As a result, a change in amount of battery charge increases, and it becomes necessary to restrict the output of the electric motor when the amount of battery charge almost exceeds a predetermined range of use. This increases the possibility that a desired work output cannot be generated.

This problem will be described in detail using FIG. 7. FIG. 7 is a timing chart illustrating behaviors of the work mode, the pump output, and the amount of battery charge. In FIG. 7, the horizontal axis denotes time while the vertical axis denotes the work mode selected corresponding to the operation of the operator, the output of the hydraulic pump, and the charge amount of the battery in this order from the top. In the chart illustrating the output of the hydraulic pump, the output of the engine is superimposed and illustrated by the dotted line. These outputs are expressed as normalized values while the maximum output of the engine is set as 100%.

Firstly, at a time t0, when the operator selects the fuel-efficiency priority mode and starts work, the output of the hydraulic pump is generated. Here, assume the case where the output of the engine is set to about 90% and the average output of the hydraulic pump in the fuel-efficiency priority mode is smaller than 90%. As illustrated in FIG. 7, in the case where the output of the hydraulic pump is smaller than the output of the engine, the generator-motor generates electric power. In the case where the output of the hydraulic pump is larger than the output of the engine, the generator-motor performs power assistance. From the time t0 to a time t1 when the fuel-efficiency priority mode is selected by the operator, the output of the hydraulic pump is often smaller than the output of the engine. Accordingly, the charge amount of the battery increases due to the electric power generated by the generator-motor.

Next, after the time t1, assume the case where the average value of the output of the hydraulic pump until the time t1 is reflected in the output of the engine after the time t1 when the operator selects the standard mode and works. As described above, since the output of the hydraulic pump is often smaller than the output of the engine until the time t1, the output of the engine is set to be smaller than 90%.

However, since the standard mode is selected by the operator after the time t1, the output of the hydraulic pump is higher compared with the output before the time t1. In this state, the output of the hydraulic pump is often larger than the output of the engine. Accordingly, the charge amount of the battery rapidly decreases due to the powering electric power of the generator-motor. Then, at a time t2 after the operator continues this work, the charge amount of the battery reaches the lower limit value and exceeds the available range. Accordingly, to inhibit the reduction in charge amount of the battery, the powering output of the generator-motor is restricted to cause a state that cannot perform power assistance. Therefore, after the time t2, it is impossible to cause the output of the hydraulic pump as illustrated by the solid line in the chart.

As just described, in the case where the average value, which is calculated in the fuel-efficiency priority mode, of the output of the hydraulic pump is reflected in the magnitude of the output of the engine in the standard mode, excess or deficiency occurs between the output of the hydraulic pump and the output of the engine due to the work mode set by the operator and the difference of work. To compensate this excess or deficiency, the output of the generator-motor increases. As a result, a change in charge amount of the battery increases, and it becomes necessary to restrict the output of the generator-motor when the charge amount of the battery almost exceeds the predetermined range of use. Thus, the output of the hydraulic pump is restricted.

The present invention has been made in view of the actual situation in the above-described conventional technique, and its object is to provide a construction machine that appropriately sets the magnitude of the engine output for each work mode.

Solution to Problem

To achieve the above-described object, a construction machine according to the present invention includes: an engine; a generator-motor configured to generate electric power by the engine; a hydraulic pump configured to be driven by the engine and the generator-motor; a hydraulic actuator configured to drive and operate a working device with a power of the hydraulic pump; an electric storage device for supplying electric power to drive the generator-motor and charging the electric power generated by the generator-motor; a work-mode selecting device configured to select a work mode from a plurality of work modes corresponding to operation of the operator; and an engine-output setting unit configured to set a magnitude of an output of the engine corresponding to the work mode selected by the work-mode selecting device. The construction machine stores a history of a magnitude of a work output that is output in a past for each of the work modes. The engine-output setting unit reflects the history of the magnitude of the work output in the past in a work mode identical to the work mode that is currently selected, so as to set the magnitude of the engine output in the currently selected work mode.

Advantageous Effects of Invention

With the above-described configuration, the present invention allows appropriately sets the magnitude of the engine for each work mode selected corresponding to the operation of the operator. Here, the problem, configuration, and effect other than those described above will be disclosed by the following description of embodiments.

BRIEF DESCRIPTION OF DRAWINGS

FIGS. 4(a) and 4(b) are control flowcharts illustrating the processing details of the control unit (HCU 100) illustrated in FIG. 2.

FIGS. 6(a) and 6(b) are charts illustrating a method for determining the work mode selected corresponding to the operation of an operator in the hydraulic excavator illustrated in FIG. 1 and a working example of the method.

DESCRIPTION OF EMBODIMENTS

Figure 1:
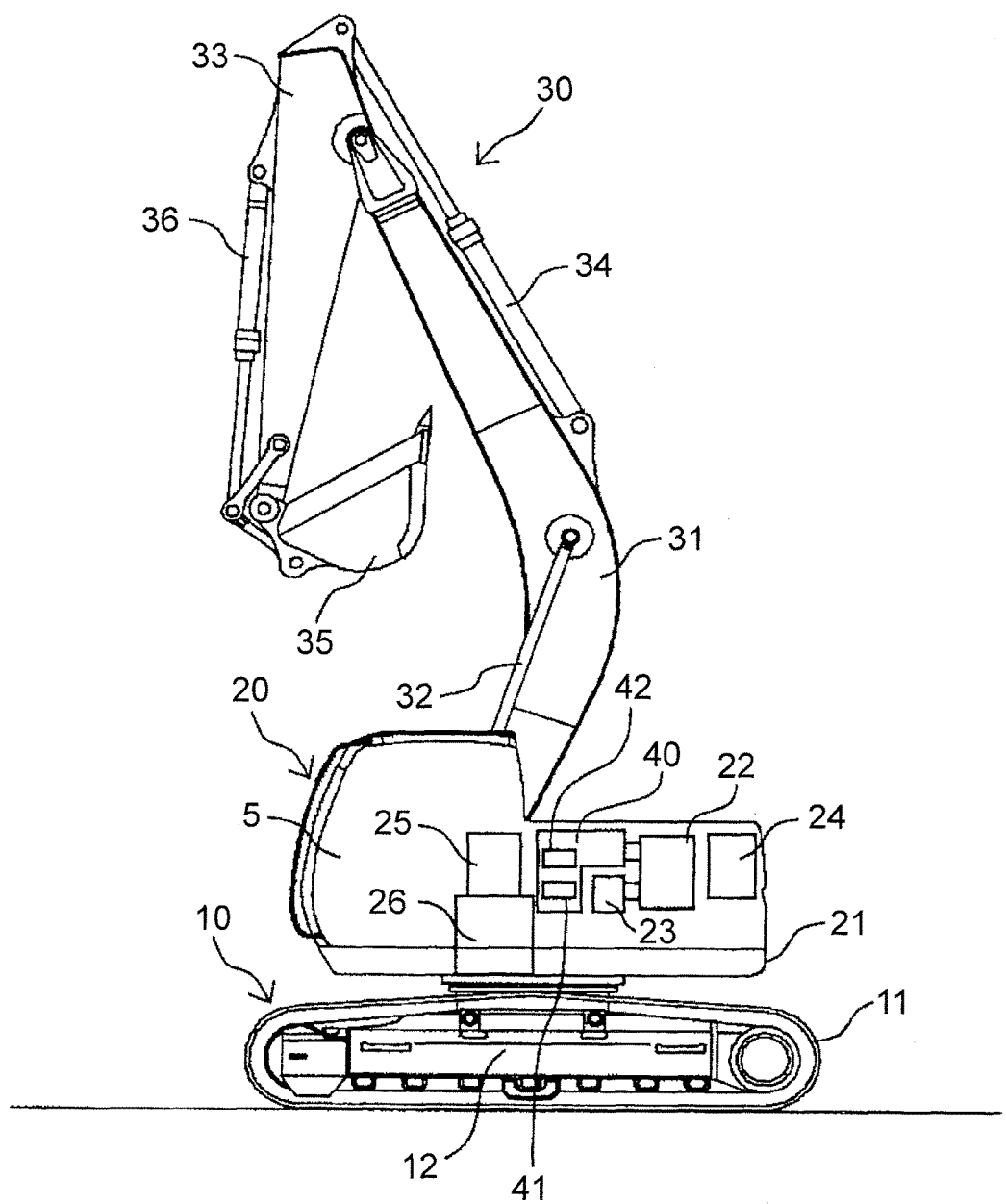
FIG. 1 is a side view of a hydraulic excavator according to an embodiment of the present invention.

One embodiment of a construction machine according to the present invention will be described below referring to the drawings. FIG. 1 is a side view of a hydraulic excavator according to the embodiment of the present invention. The hydraulic excavator illustrated in FIG. 1 mainly includes: a lower traveling body 10; an upper turning body 20, which is disposed turnably with respect to the lower traveling body 10; a cabin 5; a working device 30, which is disposed at the upper turning body 20 and performs various works; and a hydraulic actuator, which drives the working device 30.

The lower traveling body 10 is constituted of: a pair of crawlers 11 and a pair of crawler frames 12; a pair of traveling hydraulic motors, which drive and control the respective crawlers 11 independently from each other; and a deceleration mechanism and similar member (not illustrated).

The upper turning body 20 is constituted of: a turning frame 21; an engine 22, which is disposed on the turning frame 21; a generator-motor 23, which can generate electric power by the engine 22; a turning hydraulic motor (hereinafter referred to as a turning motor) 25; a battery (electric storage device) 24, which is electrically coupled to the generator-motor 23; a deceleration mechanism (not illustrated), which decelerates the rotation of the turning motor 25; a turning mechanism 26 for turnably driving the upper turning body 20 (the turning frame 21) with respect to the lower traveling body 10 by the driving force of the turning motor 25; and similar member.

The working device 30 mainly includes: a boom 31; an arm 33, which is rotatably journaled to the vicinity of the distal end portion of the boom 31; and a bucket 35, which is rotatably journaled to the vicinity of the distal end portion of the arm 33. The working device 30 is driven by the hydraulic actuator. Specifically, the boom 31 is driven by a boom cylinder 32, the arm 33 is driven by an arm cylinder 34, and the bucket 35 is driven by a bucket cylinder 36.

On the turning frame 21 of the upper turning body 20, a hydraulic system 40 is mounted. The hydraulic system 40 includes: a hydraulic pump 41, which generates hydraulic pressure for driving hydraulic actuators such as the boom cylinder 32, the arm cylinder 34, the bucket cylinder 36, the turning motor 25, and the traveling hydraulic motor (not illustrated); and a control valve 42 for driving and controlling the respective hydraulic actuators. The hydraulic pump 41 as a hydraulic pressure source is driven by the engine 22 and the generator-motor 23.

Figure 3:
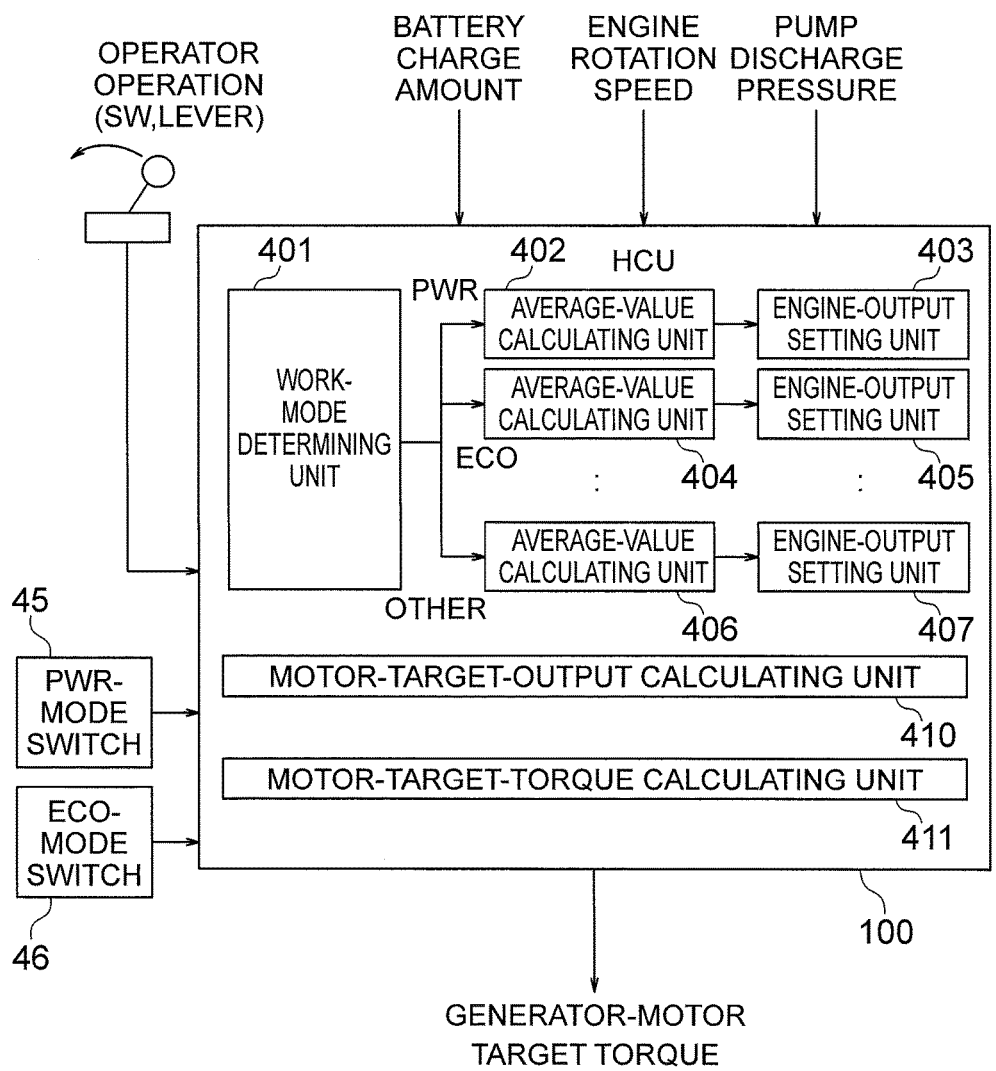
FIG. 3 is a block diagram illustrating the electrical configuration of a control unit (HCU 100) illustrated in FIG. 2.

The cabin 5 is provided with various operating devices, which the operator operates, for example, levers for operating the boom 31, the arm 33, the bucket 35, and similar member, and switches (a PWR-mode switch 45, an ECO-mode switch 46) as a work-mode selecting device for selecting the work mode (see FIG. 3).

Figure 2:
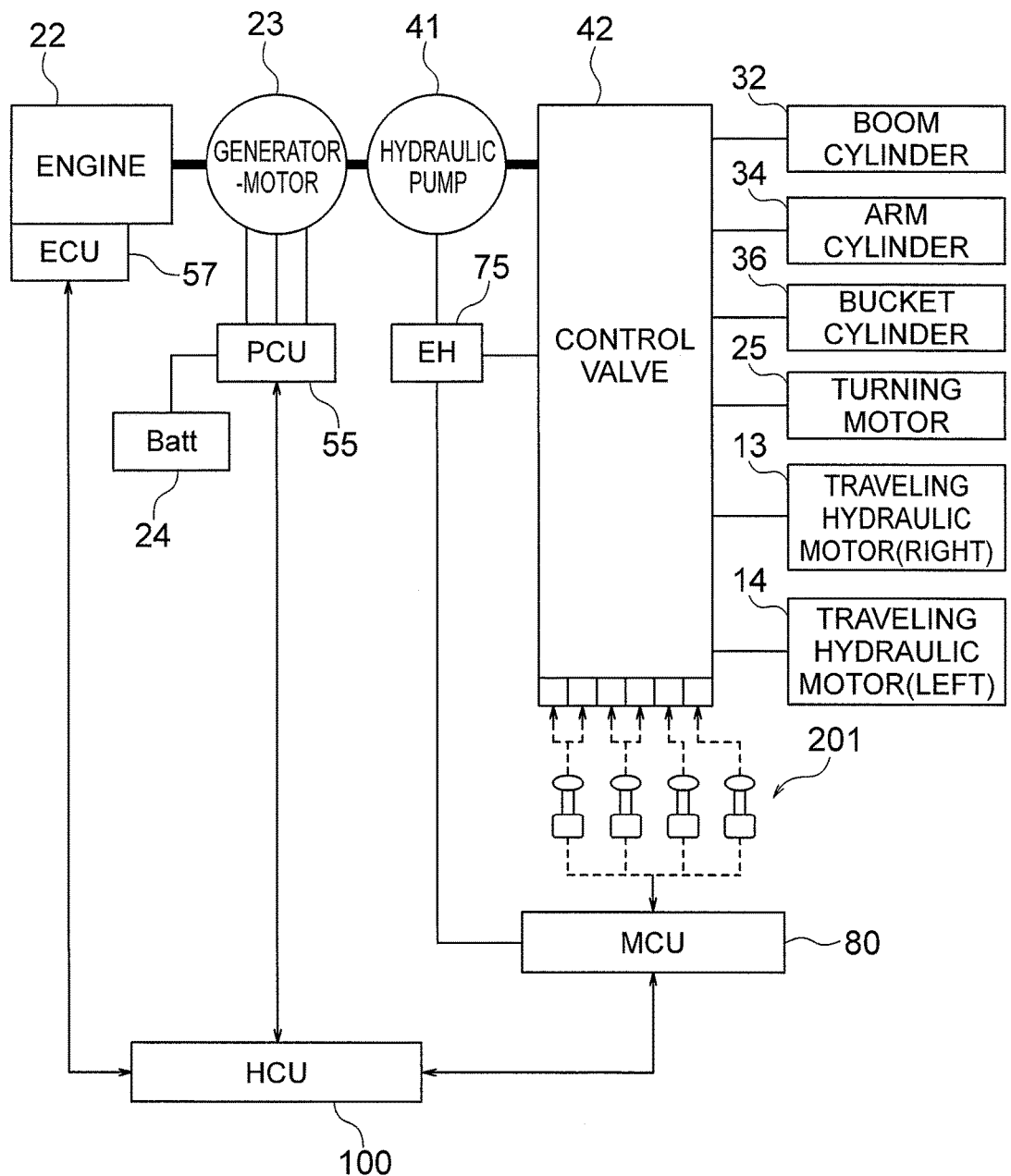
FIG. 2 is a system configuration diagram of main electrically-driven and hydraulic devices of the hydraulic excavator illustrated in FIG. 1.

FIG. 2 is a system configuration diagram of the main electrically-driven and hydraulic devices of the hydraulic excavator as one embodiment of the present invention. The power of the engine 22 is transmitted to the hydraulic pump 41 via the generator-motor 23. In response to the command from a lever 201 operated by the operator, the control valve 42 controls the discharge amounts and the discharge directions of the operating oil to the boom cylinder 32, the arm cylinder 34, the bucket cylinder 36, the turning motor 25, and traveling hydraulic motors 13 and 14.

The DC power from the battery 24 is boosted to a predetermined DC voltage by a chopper (not illustrated) or similar member within a power control unit 55 (hereinafter referred to as the PCU). The DC voltage is input to an inverter (not illustrated) or similar member within the PCU 55 for driving the generator-motor 23. Depending on the drive state (powering or regeneration) of the generator-motor 23, the battery 24 is charged and discharged.

Based on a rotation speed signal, a lever signal, a pressure signal, and similar signal detected by the PCU 55, an engine control unit 57 (hereinafter referred to as the ECU), and a machine control unit 80 (hereinafter referred to as the MCU), a hybrid control unit 100 (hereinafter referred to as the HCU) gives commands to the PCU 55, the ECU 57, and the MCU 80 so as to integrally control the engine 22, the generator-motor 23, the hydraulic pump 41, and the control valve 42.

For example, in the case where the operator operates the lever 201 so as to perform a boom raising operation, the MCU 80 controls a solenoid proportional valve 75 so as to transmit the power of the hydraulic pump 41 to the boom cylinder 32 using the control valve 42. Here, the solenoid proportional valve 75 is the device that converts an electrical signal from the MCU 80 into a hydraulic signal. At this time, the HCU 100 estimates the power required for the hydraulic pump 41 based on the lever signal detected by the MCU 80, the pressure signal of the hydraulic pump 41, and similar signal, so as to estimate the remaining amount of charge (hereinafter referred to as the SOC) of the battery 24 based on the voltage value, which is detected by the PCU 55, of the battery 24.

To appropriately allocate the power required for the hydraulic pump 41 to the engine 22 and the generator-motor 23, the HCU 100 computes an engine-rotation-speed command and a generator-motor-output command based on the estimated power of the hydraulic pump 41 and the SOC of the battery 24, so as to give commands to the respective ECU 57 and PCU 55.

In the case where the loads on a hydraulic cylinder and a hydraulic motor increase so as to cause an overload state of the hydraulic pump 41, the HCU 100 outputs a command for restricting the power of the hydraulic pump 41 corresponding to the rotation speed of the engine 22 to the MCU 80, to prevent stalling of the engine 22. The MCU 80 controls the solenoid proportional valve 75 corresponding to the command from the HCU 100 so as to restrict the power of the hydraulic pump 41.

The following describes the processing details of the HCU 100 mounted on the hydraulic excavator according to one embodiment of the present invention using FIG. 3 and FIG. 4. FIG. 3 is a block diagram illustrating the electrical configuration of the HCU 100. Here, the processing details illustrated as follows are programmed in the HCU 100 and repeatedly executed in a predetermined cycle. In the subsequent description, the output of the generator-motor 23 is defined to have a powering side as a positive value and a regeneration side (electric generation side) as a negative value. The output of the battery 24 is defined to have a discharge side as a positive value and a charge side as a negative value.

As illustrated in FIG. 3, the HCU 100 mainly includes: a work-mode determining unit 401, which determines the work mode; average-value calculating units (work-output computing unit) 402, 404, and 406, which calculate the average values of the outputs for each work mode; and engine-output setting units 403, 405, and 407, which set the magnitudes of the outputs of the engine corresponding to the calculation values of the respective average-value calculating units 402, 404, and 406.

The HCU 100 detects the operations of the mode switches 45 and 46 by the operator and the signal corresponding to the lever manipulated variable, and the work-mode determining unit 401 determines the work mode such as a standard mode (hereinafter referred to as the PWR mode) and a fuel-efficiency priority mode (hereinafter referred to as the ECO mode). The HCU 100 detects the discharge pressure of the hydraulic pump 41 so as to calculate the output of the hydraulic pump 41 using the discharge flow rate, which is estimated corresponding to the lever manipulated variable of the operator, of the hydraulic pump 41. Furthermore, the HCU 100 detects the rotation speed and the torque of the engine 22 so as to calculate the output of the engine 22.

Subsequently, the average-value calculating unit 402 calculates the average value of the output in the PWR mode corresponding to the output of the hydraulic pump 41. The engine-output setting unit 403 sets the output (the rotation speed in this embodiment) of the engine 22 corresponding to the average value (computation value), which is calculated by the average-value calculating unit 402, of the output in the PWR mode, and sets the target output of the generator-motor 23 corresponding to the output of the hydraulic pump 41. Then, corresponding to the set target output of the generator-motor 23 and the set rotation speed of the engine 22, the target torque of the generator-motor 23 is set. In the case where the work mode determined by the work-mode determining unit 401 is the PWR mode, the target torque of the generator-motor 23 is transmitted to the PCU 55.

Similarly, the average-value calculating unit 404 calculates the average value (computation value) of the output in the ECO mode corresponding to the output of the hydraulic pump 41. The engine-output setting unit 405 sets the output (the rotation speed in this embodiment) of the engine 22 corresponding to the average value, which is calculated by the average-value calculating unit 404, of the output in the ECO mode, and sets the target output of the generator-motor 23 corresponding to the output of the hydraulic pump 41. Then, corresponding to the set target output of the generator-motor 23 and the set rotation speed of the engine 22, the target torque of the generator-motor 23 is calculated. In the case where the work mode determined by the work-mode determining unit 401 is the ECO mode, the target torque of the generator-motor 23 is transmitted to the PCU 55.

Here, while in this embodiment the rotation speed is set as the target output of the engine 22, the torque may be set instead of the rotation speed.

In the case where there is another work mode determined corresponding to the operation of the operator, the average-value calculating unit 406 and the engine-output setting unit 407 execute processes similar to those in the average-value calculating units 402 and 404 and the engine-output setting units 403 and 405.

FIG. 4 is a control flowchart illustrating the processing details of the HCU 100. FIG. 4 describes the case where there are two modes of the ECO mode and the PWR mode as the work mode.

Firstly, using FIG. 4(a), a description will be given of the processing details of the work-mode determining unit 401, the average-value calculating units 402 and 404, and the engine-output setting units 403 and 405. Firstly, in step 501, the work-mode determining unit 401 determines whether or not the current work mode is the ECO mode. In the case where the ECO mode is determined, the process proceeds to step 502. In the case where the work mode is not the ECO mode (the PWR mode), the process proceeds to step 512.

In step 502, the work-mode determining unit 401 determines whether or not the previous work mode is the PWR mode. In the case of the PWR mode, it is determined that the ECO mode has just started and the process proceeds to step 503. In the case where the work mode is not the PWR mode (the ECO mode), it is determined that the ECO mode is during execution and the process proceeds to step 505. In step 505, the process that increments a timer for measuring the working time in the ECO mode is executed. Subsequently, the process proceeds to step 506. In step 506, the process that integrates the output of the hydraulic pump 41 is executed.

Subsequently, in step 507, the average-value calculating unit 404 calculates the average value of the output of the hydraulic pump 41. Specifically, the average-value calculating unit 404 executes the process that divides the integrated value calculated in step 506 by the timer (equivalent to the working time in the ECO mode) calculated in step 505. The history of the average value, which is computed in step 507, of the output of the hydraulic pump 41 is stored in a storage area (such as a RAM) (not illustrated) of the HCU 100. Here, in step 503, the initialization process to clear the timer for measuring the working time in the ECO mode and the integrate value of the output of the hydraulic pump 41 at the start of the ECO mode is executed. Step 504 is the process that updates the average value of the output in the previous work modes, and the detail will be described later.

On the other hand, in the case where the process proceeds to step 512, in this step 512, the work-mode determining unit 401 determines whether or not the previous work mode is the ECO mode. In the case of the ECO mode, it is determined that the PWR mode has just started and the process proceeds to step 513. In the case where the work mode is not the ECO mode (the PWR mode), it is determined that the PWR mode is during execution and the process proceeds to step 515. In step 515, the process that increments the timer for measuring the working time in the PWR mode is executed. Subsequently, the process proceeds to step 516. In step 516, the process that integrates the output of the hydraulic pump 41 is executed. Subsequently, in step 517, the average-value calculating unit 402 calculates the average value of the output of the hydraulic pump 41. Specifically, the average-value calculating unit 402 executes the process that divides the integrated value calculated in step 516 by the timer (equivalent to the working time in the PWR mode) calculated in step 515.

Here, in step 513, the initialization process to clear the timer for measuring the working time in the PWR mode and the integrate value of the output of the hydraulic pump 41 at the start of the PWR mode is executed. Step 514 is the process that updates the average value of the output in the previous work modes, and the detail will be described later.

The following describes the details of the processes performed in step 504 and step 514. Step 504 is the process performed after the transition from the state (a first state where a first work mode is selected) in the previous ECO mode to the state (a second state where a second work mode is selected) in the PWR mode, at the timing of the transition to the state (a third state where the first work mode is selected from the second state) in the current ECO mode. Therefore, firstly, the engine-output setting unit 405 reads out the average value of the output of the hydraulic pump 41 in the state (the first state) in the previous ECO mode, and sets this average value as a value used in the current process.

That is, when the PWR mode switches to the ECO mode, the engine-output setting unit 405 executes the process that updates an old average value, which is set in the process in step 504 in the past, to a new average value, which is calculated in the state in the latest ECO mode, in step 504.

Furthermore, in step 504, the engine-output setting unit 405 performs the process that sets the target output of the engine 22 in the current ECO mode corresponding to the updated average value. That is, the engine-output setting unit 405 executes the process that reflects the average value (Pave_eco), which is calculated in step 507, of the output of the hydraulic pump 41 in the ECO mode in the target output (Pe_eco) of the engine 22 in the ECO mode. Specifically, the target output (Pe_eco) of the engine 22 is updated using Formula (1).

$$Pe\_eco = Pave\_eco \times \beta + Pe\_eco\_old \times (1-\beta) \quad (1)$$

Here, Pe_eco_old is the target output of the engine 22 before the update, and $\beta$ ($0 \leq \beta \leq 1$) is the parameter that determines how much the average value (Pave_eco) of the output is reflected in the target output (Pe_eco) of the engine 22.

On the other hand, step 514 is the process performed after the transition from the state (the first state where the first work mode is selected) in the previous PWR mode to the state (the second state where the second work mode is selected) in the ECO mode, at the timing of the transition to the state (the third state where the first work mode is selected from the second state) in the current PWR mode. Therefore, firstly, the engine-output setting unit 403 reads out the average value of the output of the hydraulic pump 41 in the state (the first state) in the previous PWR mode, and sets this average value as a value used in the current process.

That is, when the ECO mode switches to the PWR mode, the engine-output setting unit 403 executes the process that updates an old average value, which is set in the process in step 514 in the past, to a new average value, which is calculated in the state in the latest PWR mode, in step 514.

Furthermore, in step 514, the engine-output setting unit 403 performs the process that sets the target output of the engine 22 in the current PWR mode corresponding to the updated average value. That is, in step 514, the engine-output setting unit 403 executes the process that reflects the average value (Pave_pwr), which is calculated in step 517, of the output of the hydraulic pump 41 in the PWR mode in the target output (Pe_pwr) of the engine 22 in the PWR mode. Specifically, the target output (Pe_pwr) of the engine 22 is updated using Formula (2).

$$Pe\_pwr = Pave\_pwr \times \alpha + Pe\_pwr\_old \times (1-\alpha) \quad (2)$$

Here, Pe_pwr_old is the target output of the engine 22 before the update, and $\alpha$ ($0 \leq \alpha \leq 1$) is the parameter that determines how much the average value (Pave_pwr) of the output is reflected in the target output (Pe_pwr) of the engine 22.

As just described, execution of the process illustrated in FIG. 4(a) allows calculating the average value of the parameter (for example, the output of the hydraulic pump 41) equivalent to the work output for each work mode corresponding to the operation of the operator and setting the output of the engine 22 corresponding to the respective average values by work modes.

Next, using FIG. 4(b), a description will be given of the method for calculating the target torque of the generator-motor 23. Firstly, in step 521, the discharge flow rate (Q) of the operating oil discharged from the hydraulic pump 41 corresponding to the lever manipulated variable detected by the HCU 100 is calculated. Further, in step 522, based on the discharge pressure (P), which is detected by the HCU 100, of the hydraulic pump 41 and the discharge flow rate (Q) calculated in step 521, the output (Pp) of the hydraulic pump 41 is calculated in accordance with Formula (3).

$$Pp = Q \times P \quad (3)$$

Subsequently, in step 523, a motor-target-output calculating unit 410 calculates the target output (Pa_ref) of the generator-motor corresponding to the output (Pp), which is calculated in step 522, of the hydraulic pump 41 and the engine target output (Pe_ref), which is set by the engine-output setting units 403 and 405, in accordance with Formula (4). In Formula (4), in the case where the PWR mode is determined by the work-mode determining unit 401, Pe_ref=Pe_pwr. In the case where the ECO mode is determined by the work-mode determining unit 401, Pe_ref=Pe_eco.

$$Pa\_ref = Pp - Pe\_ref \quad (4)$$

In step 524, a motor-target-torque calculating unit 411 calculates the generator-motor target torque (Ta_ref) based on the rotation speed (Na), which is calculated corresponding to the detected rotation speed of the engine 22 by the HCU 100, of the generator-motor 23 and the generator-motor target output (Pa_ref), which is calculated in step 523. Controlling the driving of the generator-motor 23 based on the generator-motor target torque (Ta_ref) calculated in step 524 allows leveling of the output of the engine 22 corresponding to the work mode.

Figure 5:
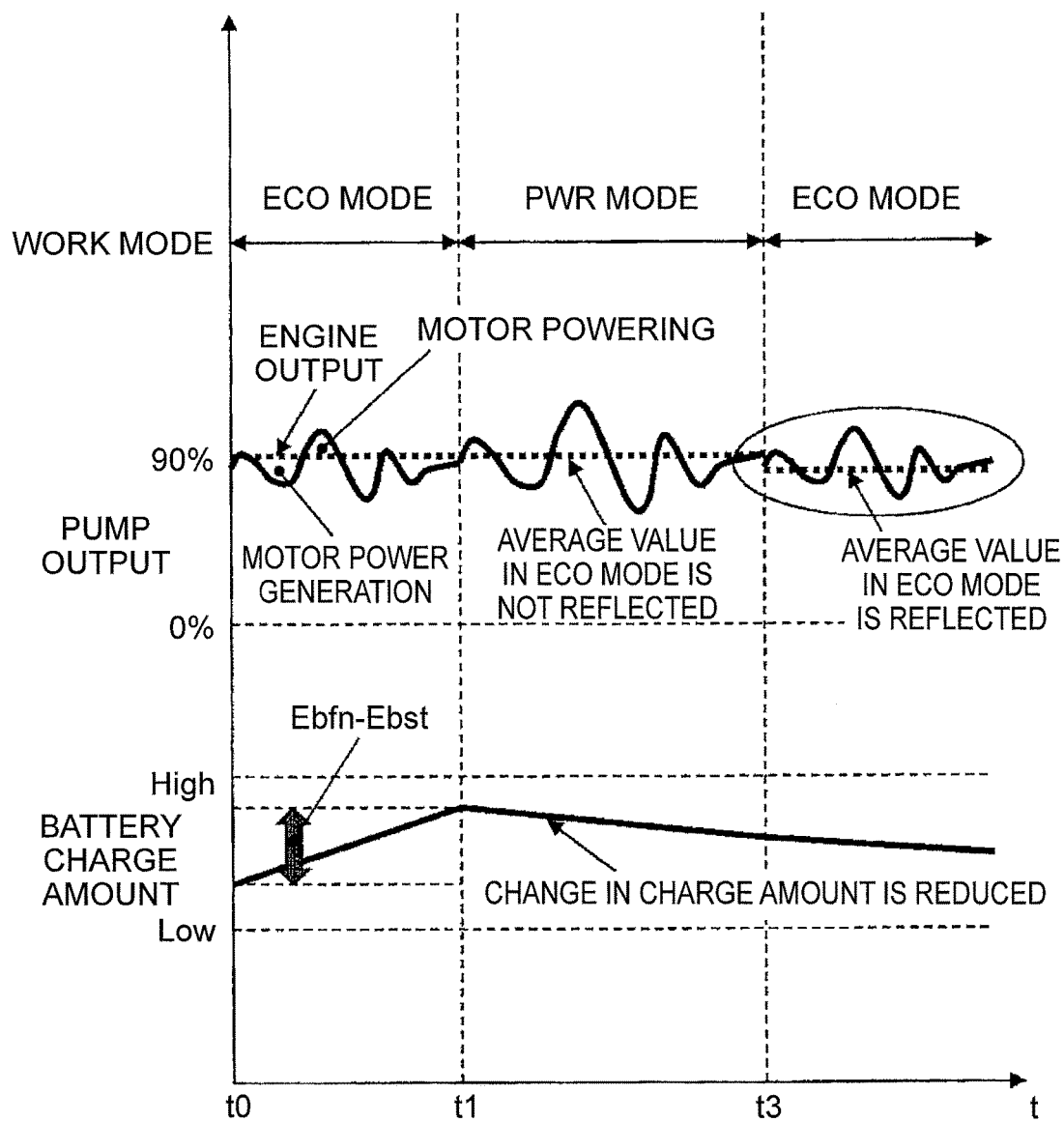
FIG. 5 is a timing chart illustrating behaviors of a work mode, a pump output, and an amount of battery charge in the hydraulic excavator illustrated in FIG. 1.

The following describes the effect of the hydraulic excavator according to this embodiment of the present invention using FIG. 5. FIG. 5 is a timing chart illustrating behaviors of the work mode, the pump output, and the amount of battery charge. In the chart, the horizontal axis denotes time while the vertical axis denotes the work mode selected corresponding to the operation of the operator, the output of the hydraulic pump 41, and the charge amount of the battery 24 in this order from the top. In the chart illustrating the output of the hydraulic pump 41, the output of the engine 22 is superimposed and illustrated by the dotted line. These outputs are expressed as normalized values while the maximum output of the engine 22 is set as 100%.

Firstly, at a time t0, when the operator selects the ECO mode and starts work, the output of the hydraulic pump 41 is generated. Here, assume the case where the output of the engine 22 is set to about 90% and the average output of the hydraulic pump 41 in the ECO mode is smaller than 90%.

As illustrated in FIG. 5, in the case where the output of the hydraulic pump 41 is smaller than the output of the engine 22, the generator-motor 23 generates electric power. In the case where the output of the hydraulic pump 41 is larger than the output of the engine 22, the generator-motor 23 performs power assistance. From the time t0 to a time t1 when the ECO mode is selected by the operator, the output of the hydraulic pump 41 is often smaller than the output of the engine 22. Accordingly, the charge amount of the battery 24 increases due to the electric power generated by the generator-motor 23.

Next, assume the case where the operator selects the PWR mode and works in the interval from time t1 to t3. From time t1 to t3, since the PWR mode is selected by the operator, the output of the hydraulic pump 41 is higher than that before the time t1. However, in this embodiment, the average value of the output of the hydraulic pump 41 in the ECO mode until the time t1 is not reflected in the output of the engine 22 in the PWR mode from time t1 to t3. Accordingly, the output of the engine 22 is set to about 90% similarly to that until the time t1.

Figure 7:
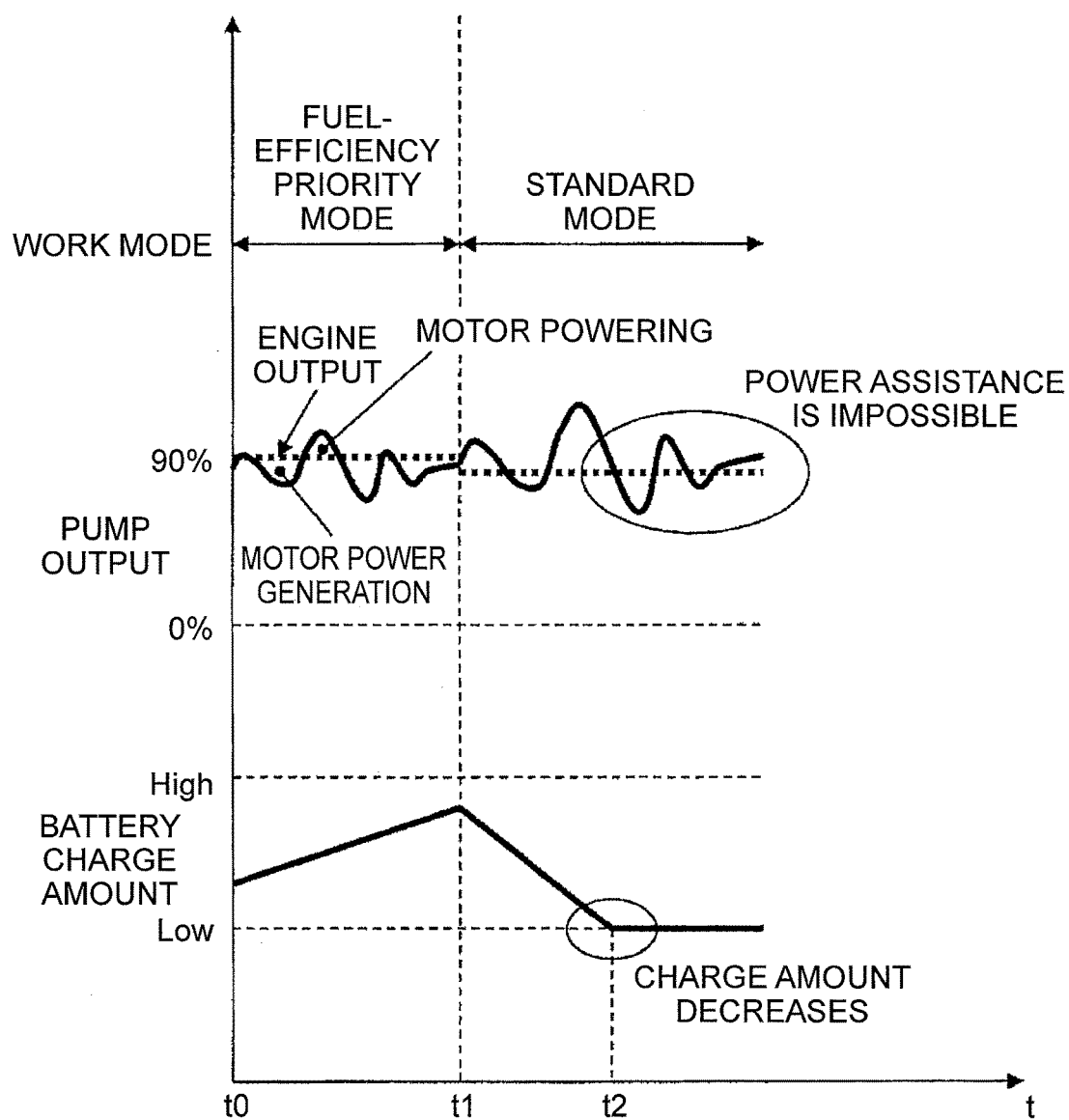
FIG. 7 is a timing chart illustrating behaviors of a work mode, a pump output, and an amount of battery charge in a hydraulic excavator according to a conventional technology.

At this time, unlike FIG. 7 illustrating the transition from the ECO mode (the fuel-efficiency priority mode in FIG. 7) to the PWR mode (the standard mode in FIG. 7) of the conventional technique, the output of the engine 22 is not reduced at the time t1. This reduces the state where the output of the hydraulic pump 41 is larger than the output of the engine 22, so as to reduce the change in charge amount of the battery 24 due to the powering electric power of the generator-motor 23. This prevents the situation where the charge amount of the battery 24 reaches the lower limit value and exceeds the available range. Afterward, when the operator selects the ECO mode again and works after the time t3, the average value of the output of the hydraulic pump 41 in the ECO mode (the latest ECO mode) until the time t1 is reflected in the output of the engine 22. Accordingly, the output of the engine 22 slightly decreases from 90%.

As just described, the average value, which is calculated in the ECO mode, of the output of the hydraulic pump 41 is not reflected in the magnitude of the output of the engine 22 in the PWR mode. Accordingly, the operator considers the difference of work corresponding to the selected work mode so as to reduce the excess or deficiency between the output of the hydraulic pump 41 and the output of the engine 22. As a result, the output of the generator-motor 23 can be reduced so as to reduce the change in charge amount of the battery 24. This reduces the situation where the charge amount of the battery 24 exceeds the predetermined range of use so as to restrict the output of the generator-motor 23. Thus, the desired work output can be generated.

Here, in the above-described embodiment, the average value of the output of the hydraulic pump 41 is described as one example of the average value of the parameter corresponding to the work output. However, a method that sets the output of the engine 22 corresponding to the charge-discharge trend of the battery 24 is also possible. For example, the charge-discharge trend of the battery 24 is determined corresponding to the difference (Ebfn−Ebst) between: the charge amount (Ebfn) of the battery 24 at the time t1 at which the ECO mode is switched to the PWR mode by operation of the operator; and the charge amount (Ebst) of the battery 24 at the time t0 at which work in the ECO mode is started, so as to determine the validity of the output setting for the engine 22 in this ECO mode.

For example, when the value of Ebfn−Ebst is positive, the battery 24 shows a charge trend. Accordingly, the output of the engine 22 is larger than the output of the hydraulic pump 41 on average. Accordingly, it is preferred that the output of the engine 22 after the time t3 be smaller than the output of the engine 22 from the time t0 to the time t1. On the other hand, when the value of Ebfn−Ebst is negative, the battery 24 shows a discharge trend. Accordingly, the output of the engine 22 is smaller than the output of the hydraulic pump 41 on average. Accordingly, it is preferred that the output of the engine 22 after the time t3 be larger than the output of the engine 22 from the time t0 to the time t1.

Therefore, in the process of step 504 (see FIG. 4), which is performed after the transition from the state (the first state where the first work mode is selected) in the ECO mode from the time t0 to the time t1 to the state (the second state where the second work mode is selected) in the PWR mode from the time t1 to the time t3, at the timing of the transition to the state (the third state where the first work mode is selected from the second state) in the ECO mode after the time t3, the engine-output setting unit 405 reflects not only the average value of the output of the hydraulic pump 41 in the interval from the time t0 to the time t1 but also the determination result of the charge-discharge trend of the battery 24 in this interval so as to set the target output of the engine 22 in the ECO mode after t3. This ensures further leveling of the output of the engine 22 in the ECO mode after t3 as the effect.

Obviously, also in the case where the PWR mode is switched to the ECO mode and then the mode is switched again to the PWR mode, similarly, it is only necessary to reflect not only the average value of the output of the hydraulic pump 41 but also the determination result of the charge-discharge trend of the battery 24 in step 514 to set the target of the engine 22 in the current PWR mode.

The following describes the work mode selected corresponding to the operation of the operator using FIG. 6. FIG. 6 is a chart illustrating a method for determining the work mode selected corresponding to the operation of the operator and a working example of the method.

Firstly, a description will be given of the method for determining the work mode and the working example of the method using FIG. 6(a). When the mode switch selects the PWR mode by the operation of the operator, the work-mode determining unit 401 performs PWR-mode determination. In this PWR-mode determination, the work-mode determining unit 401 determines the state of excavation or non-excavation taking into consideration the change in output of the hydraulic pump 41 due to the difference of work so as to determine a further subdivided work mode.

For example, in the case of the excavation state, the output of the hydraulic pump 41 is expected to be high. Accordingly, the work-mode determining unit 401 determines the work mode as "A." Based on this determination, the HCU 100 sets the output reference value of the engine 22 to 100%. In the case of the non-excavation state, the output of the hydraulic pump 41 is expected to be slightly lower than that in the excavation state. Accordingly, the work-mode determining unit 401 determines the work mode as "B." Based on this determination, the HCU 100 sets the output reference value of the engine 22 to 80%.

When the mode switch selects the ECO mode by operation of the operator, the work-mode determining unit 401 performs ECO-mode determination. In this ECO-mode determination, similarly to the PWR-mode determination, the work-mode determining unit 401 determines the state of excavation or non-excavation taking into consideration the change in output of the hydraulic pump 41 due to the difference of work so as to determine a further subdivided work mode.

For example, in the case of the excavation state, the output of the hydraulic pump 41 is expected to be high. Accordingly, the work-mode determining unit 401 determines the work mode as "C." Based on this determination, the HCU 100 sets the output reference value of the engine 22 to 90%. In the case of the non-excavation state, the output of the hydraulic pump 41 is expected to be slightly lower than that in the excavation state. Accordingly, the work-mode determining unit 401 determines the work mode as "D." Based on this determination, the HCU 100 sets the output reference value of the engine 22 to 70%.

The following describes the method for determining the excavation or non-excavation state in FIG. 6(a), using FIG. 6(b). A condition No. 1 shows the case where the previous non-excavation determination flag is ON, that is, the non-excavation state. In No. 1, in the case where the pump discharge pressure is equal to or more than a predetermined value, the arm-crowding (arm-pulling) manipulated variable is equal to or more than a predetermined value, and any of the boom-raising manipulated variable and the bucket-crowding (bucket-pulling) manipulated variable is equal to or more than a predetermined value, the HCU 100 sets the non-excavation determination flag to OFF, that is, determines the excavation state and otherwise continues the determination of the non-excavation state.

A condition No. 2 shows the case where the previous non-excavation determination flag is OFF, that is, the excavation state. In No. 2, in the case where the pump discharge pressure is equal to or more than a predetermined value and the arm-crowding (arm-pulling) manipulated variable is equal to or more than a predetermined value, the HCU 100 sets the non-excavation determination flag to OFF, that is, continues the determination of the excavation state and otherwise sets the non-excavation determination flag to ON so as to determine the non-excavation state.

Accordingly, in the case of the non-excavation state, the state is determined by the workload and the compound operation of: arm crowding (arm pulling), and boom raising and bucket crowding (bucket pulling). In the case of the excavation state, the state is determined by the workload and the single operation of arm crowding (arm pulling). This allows accurately determining the excavation/non-excavation state.

As illustrated in FIG. 6, the work mode is subdivided taking into consideration not only the operation of the mode switch by the operator but also the lever manipulated variable, the load of the hydraulic pump 41, and similar parameter, so as to have the output reference value of the engine 22 for each work mode. This further reduces the excess or deficiency between the outputs of the engine 22 and the hydraulic pump 41 due to the difference of work.

The embodiment described above is only given as an example for explanation of the present invention; and the range of the present invention is not to be considered as being limited only to the scope of that embodiment. A person skilled in the art will be able to implement the present invention in various other different ways, without departing from the gist of the present invention.

For example, the above-described embodiment has the configuration that calculates the average value of the output of the hydraulic pump 41 for each work mode. Instead of this configuration, it is possible to employ the configuration that calculates the most frequent value as the output value of the hydraulic pump 41, that is, the mode (equivalent to the computation value of the present invention) for each work mode.

In the above-described embodiment, the description is given of the configuration where the engine-output setting unit reflects the determination result of the charge-discharge trend of the battery 24 in the average value of the output of the hydraulic pump 41 to set the target output of the engine 22. However, the engine-output setting unit may set the target output of the engine 22 corresponding only to the determination result of the charge-discharge trend of the battery 24. Obviously, this configuration also allows leveling of the output of the engine 22 for each work mode.

Here, the present invention is applicable to any type of construction machine insofar as the construction machine has a configuration that drives a hydraulic pump by an engine and assists the driving of the engine using a motor. For example, the present invention may be applied to a wheel loader or a crane.

REFERENCE SIGNS LIST

22 engine
23 generator-motor
24 battery (electric storage device)
30 working device
32 boom cylinder (hydraulic actuator)
34 arm cylinder (hydraulic actuator)
36 bucket cylinder (hydraulic actuator)
41 hydraulic pump
45 PWR-mode switch (work-mode selecting device)
46 ECO-mode switch (work-mode selecting device)
100 hybrid control unit (HCU)
401 work-mode determining unit
402, 404, 406 average-value calculating unit (work-output computing unit)
403, 405, 407 engine-output setting unit

The invention claimed is:

1. A construction machine comprising:
   an engine;
   a generator-motor configured to generate electric power by the engine;
   a hydraulic pump configured to be driven by the engine and the generator-motor;
   a hydraulic actuator configured to drive and operate a working device with power of the hydraulic pump;
   an electric storage device for supplying electric power to drive the generator-motor and that is charged by the electric power generated by the generator-motor;
   a work-mode selecting device configured to select a work mode from a plurality of work modes, including a standard mode and a fuel-efficiency priority mode, corresponding to an operation of an operator;
   an engine-output setting unit configured to set a target output of the engine corresponding to the work mode selected by the work-mode selecting device,
   wherein for each of the work modes, average values of work outputs of the hydraulic pump are calculated, and an old average value of a work output that is calculated in a past is updated to a currently calculated average value at a time of switching of the working modes, and
   wherein the engine-output setting unit sets the target output of the engine in the work mode currently selected, based on the updated average value of the work output of the hydraulic pump when the old average value in a work mode identical to the work mode currently selected is stored.

2. The construction machine according to claim 1,
   wherein the engine-output setting unit determines a charge-discharge trend of the electric storage device for each of the work modes to set the target output of the engine corresponding to a determination result of the charge-discharge trend.

3. The construction machine according to claim 2,
   wherein, after a transition from a first state where a first work mode is selected to a second state where a second work mode is selected, at a time of a transition to a third state where the first work mode is selected from the second state, the engine-output setting unit sets the target output of the engine in the third state corresponding to the determination result of the charge-discharge trend of the electric storage device in the first state.

4. The construction machine according to claim 1,
   wherein the construction machine further sets respective output reference values of the engine based on a determination result of a state of excavation work or non-excavation work for the plurality of respective work modes, and
   the engine-output setting unit sets the target output of the engine in the work mode currently selected, corresponding to the work output of the hydraulic pump in the past and the output reference value of the engine that is set based on the work mode currently selected and the determination result of the state of excavation work or non-excavation work.

* * * * *